No. 860,108. PATENTED JULY 16, 1907.
T. F. SHERIDAN.
STEAM TURBINE.
APPLICATION FILED DEC. 26, 1905. RENEWED DEC. 17, 1906.
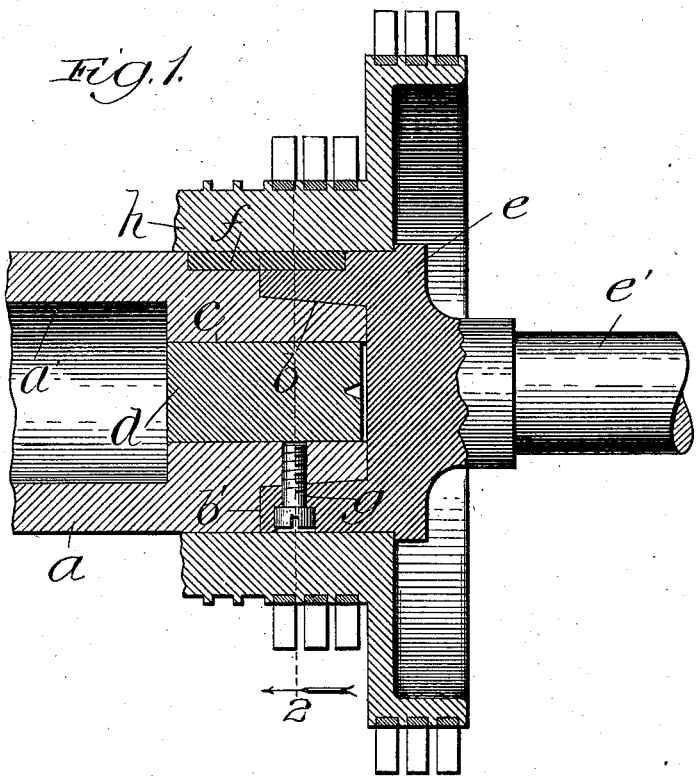
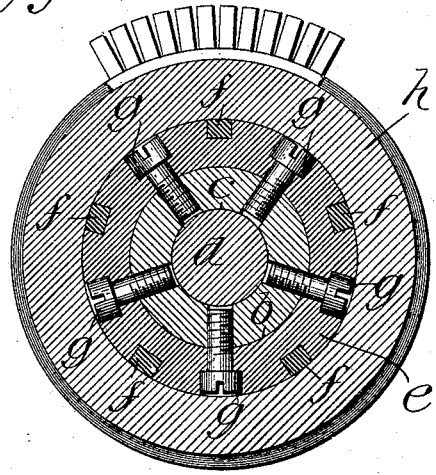

UNITED STATES PATENT OFFICE.

THOMAS F. SHERIDAN, OF CHICAGO, ILLINOIS, ASSIGNOR TO ALLIS-CHALMERS COMPANY, OF MILWAUKEE, WISCONSIN, A CORPORATION OF NEW JERSEY.

STEAM-TURBINE.

No. 860,108.   Specification of Letters Patent.   Patented July 16, 1907.

Application filed December 26, 1905. Renewed December 17, 1906. Serial No. 348,292.

*To all whom it may concern:*

Be it known that I, THOMAS F. SHERIDAN, a citizen of the United States, residing at Chicago, in the county of Cook and State of Illinois, have invented certain new and useful Improvements in Steam-Turbines, of which the following is a specification.

My invention relates to improvements in elastic fluid or steam turbines, having special reference to turbines of the "Parsons" type, and has for its object to improve the construction of the rotor of the turbine, by providing a multi-part tubular shaft or rotor with simple and economical means for effectually joining or holding the parts together while in operative condition.

The invention consists in the features, combinations and details of construction hereinafter described and claimed.

In the drawings—Figure 1 is a longitudinal sectional detail of a portion of one end of a steam turbine rotor, as it appears when constructed in accordance with my improvements. Fig. 2 is a cross sectional view, taken on the line 2 of Fig. 1, looking in the direction of the arrow.

In turbines of the "Parsons" type, it is desirable to construct the rotor in such manner that it will combine extreme rigidity and strength with lightness, as it is well-known that the rotative speeds in this class of engines is extremely high.

To attain these objects, I construct a rotor comprising a hollow shaft or tubular portion $a$, of the desired size, shape and strength. This main tubular portion has an enlarged central bore $a'$, and each end of the shaft of the rotor is provided with a, preferably, reduced parallel cylindrical bore $c$, though this may be of any size— in fact, the entire bore of the length of the main portion may be of uniform diameter and provided with grooves near each end instead of the large bore. The large bore is for the purpose of making the shaft lighter than it otherwise would be, as well as for preventing the tool from running into or forming a shoulder when boring either end. Each end of the rotor shaft is turned down to reduced diameter, so as to provide a tapered end portion $b$ and a shoulder portion $b'$.

For the purpose of strengthening each end of the rotor shaft after it has been bored and for closing each end of the rotor shaft, a plug $d$ is provided, of a diameter slightly larger than the bore $c$. This plug may be driven into position, or it may be inserted by the ordinary shrinking operation, preferably, by shrinking when conditions or circumstances will permit. It will be seen, therefore, that the rotor shaft when thus formed and the plugs inserted is to all intents and purposes a solid shaft with re-inforced closed ends. By closing the ends of the rotor shaft in the manner described, not only are the ends strengthened, but the moisture and deleterious elements are prevented from entering into the bore where any injurious action cannot be readily discovered or minimized. The ends thus strengthened form also a firm and rigid support for the drums of the turbine, as will be hereinafter described. After the plugs are put into position, the rotor shaft should be re-centered and machined for its finishing operations—that is, the tapered end portion may now be reduced to the finished diameter and the exterior cylindrical surface of the shaft machined to any desired shape and size. To provide a journal for each end of the rotor shaft, I, preferably, make stub shafts having cap portions $e$, bored out or recessed and tapered, so as to fit the taper $b$ at each end of the rotor shaft. These stub shafts are preferably formed in such a manner that they will come in close contact with the shoulder $b'$.

When the parts are in position—or previous to assembling—a multiplicity of key-ways is provided in both the main and cap parts of the rotor shaft, in which are inserted keys $f$ to prevent independent lateral movement of the parts. A plurality of headed bolts or cap screws $g$ is also provided and passed through the encircling cap portions of the stub shafts into threaded engagement with the ends of the main rotor shaft portion, as shown particularly in the drawings. The shafts and keys together prevent lateral and longitudinal motion of the parts—the screws preventing independent longitudinal movement, while the keys prevent the independent lateral movements of the parts. The keys also take off all shearing action of the bolts—all of which will be understood and appreciated by those skilled in the art.

The stub shafts are provided with reduced extensions $e'$. These extensions may be machined to form journal portions, which can be fitted in desired bearings in the stator or casing of the machine—not shown.

One of the drum portions $h$, for the rotor carrying blades $i$, is fitted over the rotor shaft so as to engage the end of the main portion of the rotor and a part of the encircling cap. The drum portion thus serves to hold the parts in longitudinal alinement, while the solid construction of the shaft at this end, as before mentioned, furnishes a secure and rigid support for the drum.

Although I have shown in the drawings the construction of the rotor at one end only, it will be understood that the construction is the same at both ends.

I claim:

1. In an elastic fluid turbine, a turbine rotor comprising a hollow main portion with reduced ends, a plug portion tightly inserted in each of the open ends of the tubular portion so as to re-inforce and strengthen the same, a stub shaft portion provided with an encircling cap fitting the reduced portions at each end of the main portion, and means to prevent independent movement of the parts.

2. In an elastic fluid turbine, a rotor comprising a main hollow portion having closed ends, the ends of the main portion being reduced, a stub shaft having an encircling cap fitting each reduced end of the shaft, and means for securing the parts together to prevent independent movement thereof.

3. In an elastic fluid turbine, a rotor comprising a main tubular portion provided with enlarged central and reduced end bores and reduced exterior tapered portions on each end of the tubular portion, a plug tightly and rigidly inserted in each of the reduced bores at each end of the tubular portion so as to re-inforce the same, grooves in the tubular portion and the stub shaft keys inserted therein to prevent independent lateral movement of the parts, and bolts passed through the cap portion of the stub shafts and engaging the ends of the tubular portion to prevent independent longitudinal movement of the parts.

4. In an elastic fluid turbine, a rotor consisting of a hollow portion having reduced ends, a plug tightly and rigidly inserted in each of the open ends of the tubular portion, a stub shaft portion provided with a cap encircling the reduced ends of the tubular portion, means to prevent independent movement of the parts, and a bladed drum mounted on the tubular portion over the joints between the tubular portion and the stub shafts.

THOMAS F. SHERIDAN.

Witnesses:
ANNIE C. COURTENAY,
JENNIE A. MacEDWARD.